L. O. AMANSON & M. H. ULRICH.
HEADLIGHT FOR AUTOMOBILES.
APPLICATION FILED DEC. 9, 1910.

1,010,340.

Patented Nov. 28, 1911.

2 SHEETS—SHEET 1.

Inventors
M. H. Ulrich
and L. O. Amanson
By Harry E. Chandlee.
Attorneys

Witnesses

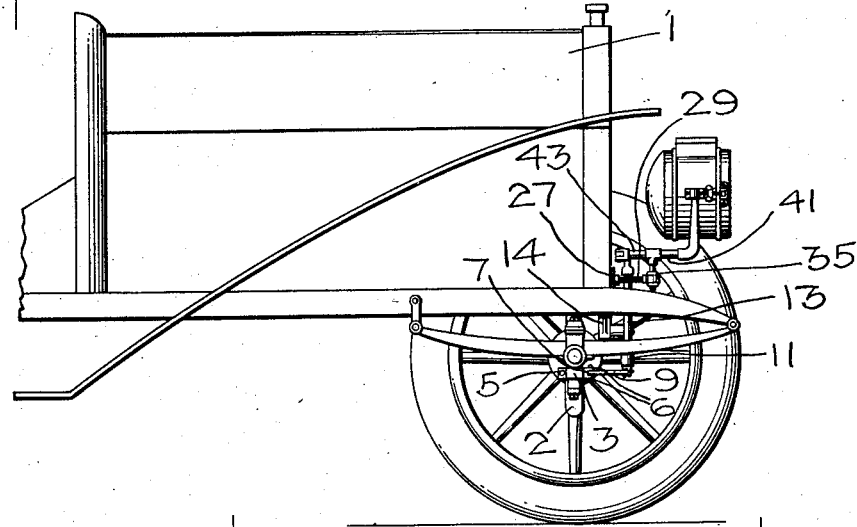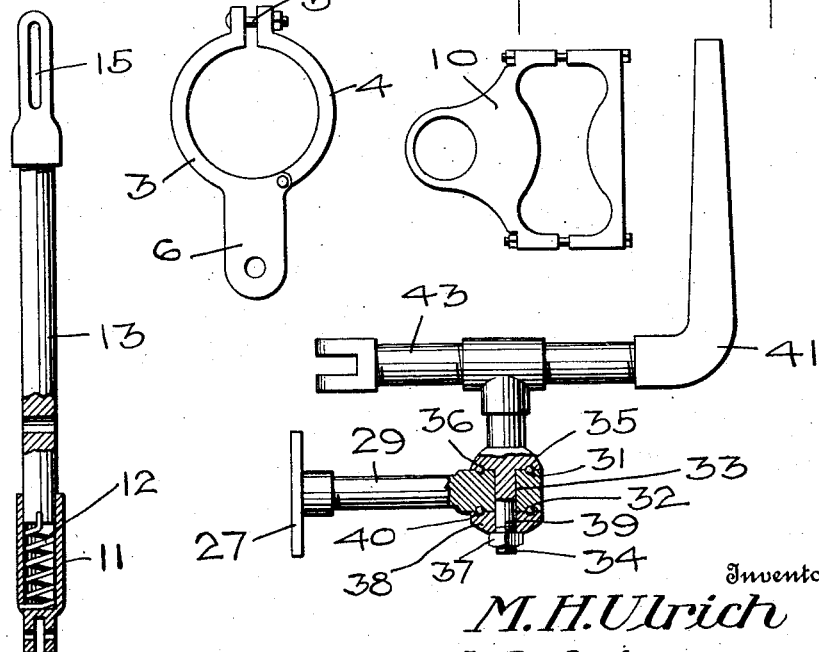

UNITED STATES PATENT OFFICE.

LYMAN O. AMANSON AND MILTON H. ULRICH, OF MILLER, SOUTH DAKOTA.

HEADLIGHT FOR AUTOMOBILES.

1,010,340.   Specification of Letters Patent.   Patented Nov. 28, 1911.

Application filed December 9, 1910. Serial No. 596,541.

*To all whom it may concern:*

Be it known that we, LYMAN O. AMANSON and MILTON H. ULRICH, citizens of the United States, residing at Miller, in the county of Hand and State of South Dakota, have invented certain new and useful Improvements in Headlights for Automobiles, of which the following is a specification.

This invention relates to improvements in mechanisms for automatically operating the head lights of automobiles and the like, and has for its object to provide an apparatus of this character so that the light from the lamps will be at all times projected in the travel of the machine.

Other objects and advantages will be apparent from the following description, and it will be understood that changes in the specific structure shown and described may be made within the scope of the claim without departing from the spirit of the invention.

Figure 1:
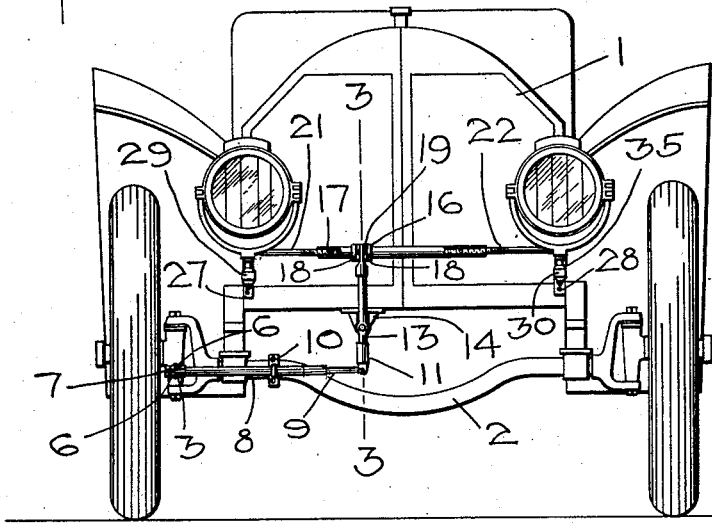
Figure 2:
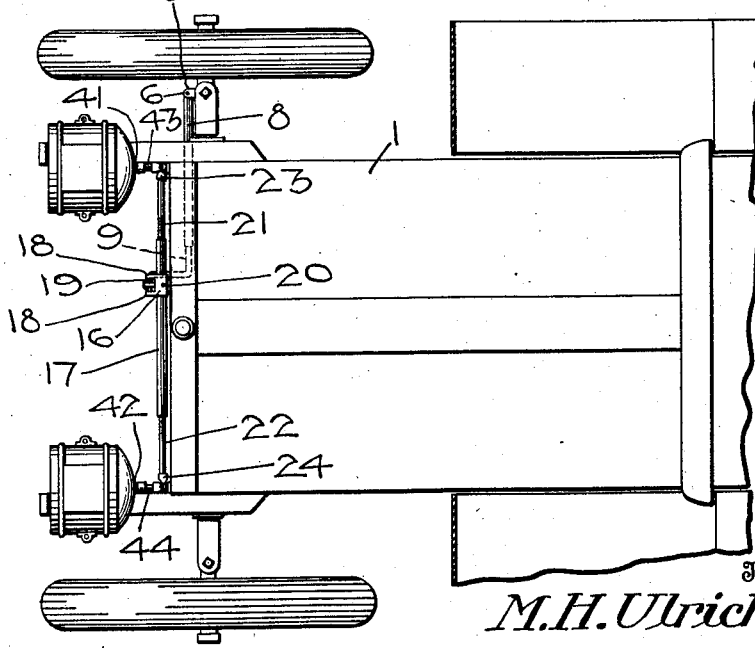

In the accompanying drawings: Figure 1 is a front elevation of a vehicle equipped with our improved apparatus. Fig. 2 is a plan view of the apparatus, showing the same applied to an automobile. Fig. 3 is a sectional view on line 3—3 of Fig. 1. Fig. 4 is a detail sectional elevation showing the lamp mounting. Fig. 5 is a side elevation of the front portion of the automobile, with the wheel removed. Fig. 6 is a detail view of the axle clamp. Fig. 7 is a similar view of the knuckle clamp.

Referring to the drawings, the numeral 1 designates a portion of an automobile, of the usual construction, and having an axle 2. To each end of the axle are secured the usual steering knuckles. To the movable portion of the steering knuckle is attached a clamp 3, said clamp comprising the hinged finger 4, so that the same may be readily applied to the usual steering knuckle, and held thereon by a bolt 5. The clamp 3 is provided with ears 6—6, said ears being provided with suitable bolt openings. Pivotally connected between the ears 6—6 is a reduced end 7 of an internally screw-threaded tube 8. Adapted for movement within the tube 8 is a rod 9, said rod being provided for a certain distance of its length with screw threads. The tube 8 is supported in parallel relation with the axle 2 by a clamp 10, said clamp consisting of two parts, one of said parts being provided with a cylindrical opening of sufficient diameter to allow the tube to slide freely therein. Pivotally secured to the inner end of the rod 9 is the lower end of a tubular member 11 and in which is placed a coil spring 12. Adapted for vertical movement in the tubular member 11 is a rod 13, the lower end of which rests upon the coil spring 12. The rod 13 is pivotally connected to a support 14, said support being secured to the radiator of the automobile, or in any suitable place. The upper end of the rod 13 is provided with a vertical slot 15, said slot being pivotally connected to a clamp 16 carried upon a horizontal internal screw-threaded tube 17, said clamp being formed with ears 18—18, between which the upper end of the rod 13 is positioned. The bolt 19 is passed through said ears and through the slot 15. The clamp 16 is provided with a set screw 20, said clamp may be adjusted in any position upon the tube 17. Adapted to be placed within the opposite ends of the tube 17 are rods 21 and 22, said rods being screw-threaded to engage the internal screw-threads of the tube 17. To the opposite ends of the rods 21 and 22 are suitably secured caps 23 and 24, respectively, said caps being provided with bolt openings.

Suitably supported upon the front portion of the automobile are brackets 27 and 28, said brackets being provided with forwardly extending rods 29 and 30, respectively. The outer end of the rods 29 and 30 is formed with upper and lower annular raceways 31 and 32, and vertical openings 33 through which pass lamp bracket pins 34. The lamp brackets are each formed with enlargements 35, said enlargements having annular grooves 36 formed in their under faces. The pins 34 are provided near their lower ends with screw threads to receive clamping nuts 37. Plates 38, having central openings 39 and formed with annular grooves 40 are positioned under the rods 29 and 30, respectively, and held in their proper positions by the nuts 37. Thus it will be seen that the annular grooves form raceways, and in which are placed ball bearings, so that the lamps will turn freely.

Formed integral with each lamp bracket are forwardly extending arms 41 and 42, and rearwardly extending arms 43 and 44. To the outer ends of the forwardly extending arms are mounted the usual automobile lamps. The rearwardly extending arms 43 and 44 are formed with bifurcations to receive the reduced ends of the caps 23 and 24, said reduced ends being pivotally connected to the arms 43 and 44, so that when the tube 17 is moved, the lamps will also be moved to project the light in the line of travel of the machine.

From this construction it will be plain that when the steering mechanism is operated, and the position of the wheels changed, the rod 9 will shift the tube 11 and rod 13 in whatever direction the wheel will assume, thereby shifting the rods 21 and 22 so that the lamps will project their rays in whatever direction the machine is traveling. By placing the coil spring within the tube 11 the rod 13 will compress said spring when the vehicle is traveling to compensate for the movement between the vehicle body and axle, and will at all times form an operative connection between the parts.

By providing the tubes and rods with screw-threaded connections, the parts may be readily attached to vehicles of different sizes, by simply adjusting the different parts by any suitable tool.

If desired, ball bearings may be placed between the clamp 16 and support 14, to allow free movements of the parts.

What is claimed is:

In combination with the usual knuckle steering gear of a vehicle, of an internally screw-threaded tube having one of its ends secured thereto, a screw-threaded rod adjustably carried in said tube and having one of its ends pivotally connected to the lower end of a tubular member, a coil spring in said member, a rod pivotally supported upon a portion of the vehicle and having its lower end slidably mounted in the tubular member to engage the coil spring therein, an internally screw-threaded tube pivotally connected to the upper end of said rod, oppositely disposed rods adapted to engage in said tube, caps secured to the ends of the oppositely disposed rods and provided with bolt openings, lamp carrying brackets secured to the vehicle and provided with lamp supporting arms, said arms being pivotally connected to said caps so that when the direction of the wheels of the vehicle is changed the lamps will be partially rotated.

In testimony whereof we affix our signatures, in presence of two witnesses.

LYMAN O. AMANSON.
MILTON H. ULRICH.

Witnesses as to the signature of Lyman O. Amanson:
    FLORENCE E. CLAYTON,
    I. R. RUBIN.

Witnesses as to the signature of Milton H. Ulrich:
    F. D. GREENE,
    A. B. CABALAN.

---

Copies of this patent may be obtained for five cents each, by addressing the "Commissioner of Patents, Washington, D. C."